US012272063B2

(12) United States Patent
Huet et al.

(10) Patent No.: US 12,272,063 B2
(45) Date of Patent: Apr. 8, 2025

(54) APPARATUSES AND METHODS FOR TRAINING AND USING COMPUTATIONAL OPERATIONS FOR DIGITAL IMAGE PROCESSING

(71) Applicant: Median Technologies, Valbonne (FR)

(72) Inventors: Benoit Huet, Roquefort les Pins (FR); Pierre Baudot, Marseilles (FR); Elias Munoz, Biot (FR); Ezequiel Geremia, Mougins (FR); Jean-Christophe Brisset, Valbonne-Sophia Antipolis (FR); Vladimir Groza, Novosibirsk (RU)

(73) Assignee: Median Technologies, Valbonne (FR)

( * ) Notice: Subject to any disclaimer, the term of this patent is extended or adjusted under 35 U.S.C. 154(b) by 0 days.

(21) Appl. No.: 18/807,820

(22) Filed: Aug. 16, 2024

(65) Prior Publication Data

US 2024/0412363 A1    Dec. 12, 2024

Related U.S. Application Data

(63) Continuation of application No. PCT/EP2023/053233, filed on Feb. 9, 2023.

(51) Int. Cl.
G06T 7/00 (2017.01)
G06T 7/11 (2017.01)
(Continued)

(52) U.S. Cl.
CPC .............. *G06T 7/0012* (2013.01); *G06T 7/11* (2017.01); *G06T 7/62* (2017.01); *G06V 10/26* (2022.01);
(Continued)

(58) Field of Classification Search
CPC . G06T 7/0012; G06T 7/11; G06T 7/62; G06T 2200/04; G06T 2207/20036;
(Continued)

(56) References Cited

U.S. PATENT DOCUMENTS 9,349,178 B1 *  5/2016  Itu ........................ G16H 20/00
9,504,529 B2    11/2016 Raffy et al.
(Continued)

FOREIGN PATENT DOCUMENTS

CN    113066583 A    7/2021
WO    2022063199 A1    3/2022
(Continued)

OTHER PUBLICATIONS

Leonardi et al., "Multiple reconstruction and dynamic modeling of 3D digital objects using a morphing approach", Vis Comput (2015), pp. 557-574 (Year: 2014).*

(Continued)

*Primary Examiner* — Ping Y Hsieh
*Assistant Examiner* — Jose M Torres
(74) *Attorney, Agent, or Firm* — Baker & McKenzie LLP

(57) ABSTRACT

An apparatus and method for training and using a computing operation for digital image processing are provided. The apparatus and method may be used for 3-dimensional medical images. An exemplary method for digital image processing comprises: receiving an image displaying at least one detectable structure, determining the detectable structure; segmenting the image to obtain a segmentation mask that is associated with a geometric shape and comprises at least one quantifiable visual feature; generating a mesh based on the quantifiable visual feature; computing at least on quantifiable visual parameter based on the mesh; extracting quantifiable visual data from the image based on the quantifiable visual parameter; training the computing operation with the (Continued)

quantifiable visual data. The method for digital image processing further comprises: receiving another image; segmenting, generating a mesh, computing quantifiable visual parameters, and extracting quantifiable visual data; and classifying the extracted quantifiable visual data with the trained computing operation.

20 Claims, 7 Drawing Sheets

(51) Int. Cl.
  *G06T 7/62* (2017.01)
  *G06V 10/26* (2022.01)
  *G06V 10/764* (2022.01)
  *G06V 10/77* (2022.01)
  *G06V 10/774* (2022.01)
(52) U.S. Cl.
  CPC ........ *G06V 10/764* (2022.01); *G06V 10/7715* (2022.01); *G06V 10/774* (2022.01); *G06T 2200/04* (2013.01); *G06T 2207/20036* (2013.01); *G06T 2207/20081* (2013.01); *G06T 2207/30004* (2013.01); *G06V 2201/03* (2022.01)
(58) Field of Classification Search
  CPC ........... G06T 2207/20081; G06T 2207/30004; G06V 10/26; G06V 10/764; G06V 10/7715; G06V 10/774; G06V 2201/03
  See application file for complete search history.

(56) References Cited

U.S. PATENT DOCUMENTS

| | | | |
|---|---|---|---|
| 9,595,103 B2 | 3/2017 | Madabhushi et al. | |
| 9,639,933 B2 | 5/2017 | Liang et al. | |
| 9,767,555 B2 | 9/2017 | Madabhushi et al. | |
| 10,130,295 B2 * | 11/2018 | Smith | A61B 5/055 |
| 10,846,367 B2 | 11/2020 | Madabhushi et al. | |
| 11,049,223 B2 | 6/2021 | Yang et al. | |
| 11,094,067 B2 | 8/2021 | Wang | |
| 11,189,029 B2 | 11/2021 | Yip | |
| 11,244,453 B2 | 2/2022 | Grbic et al. | |
| 11,276,173 B1 | 3/2022 | Putha et al. | |
| 11,403,750 B2 | 8/2022 | Kamen et al. | |
| 11,568,538 B2 | 1/2023 | Hong et al. | |
| 11,861,832 B2 | 1/2024 | Warier et al. | |
| 2004/0252870 A1 | 12/2004 | Reeves et al. | |
| 2005/0207630 A1 | 9/2005 | Chan et al. | |
| 2006/0290695 A1 * | 12/2006 | Salomie | G06T 17/20 |
| | | | 345/423 |
| 2007/0165924 A1 * | 7/2007 | Nicponski | G06T 7/0012 |
| | | | 382/128 |
| 2015/0148658 A1 | 5/2015 | Smith | |
| 2020/0005461 A1 | 1/2020 | Mp | |
| 2021/0225511 A1 | 7/2021 | Kiraly et al. | |
| 2021/0287799 A1 | 9/2021 | Guendel et al. | |
| 2021/0290316 A1 | 9/2021 | Ng et al. | |
| 2022/0051410 A1 | 2/2022 | Mp | |
| 2022/0198668 A1 | 6/2022 | Park et al. | |
| 2023/0196639 A1 | 6/2023 | Frushour | |
| 2023/0230705 A1 | 7/2023 | El-Baz et al. | |

FOREIGN PATENT DOCUMENTS

| | | |
|---|---|---|
| WO | 2022139170 A1 | 6/2022 |
| WO | 2022145898 A1 | 7/2022 |
| WO | 2022186594 A1 | 9/2022 |
| WO | 2022249198 A1 | 12/2022 |
| WO | 2023005634 A1 | 2/2023 |

OTHER PUBLICATIONS

Choi et al., "Reproducible and Interpretable Spiculation Quantification for Lung Cancer Screening", Computer Methods and Programs in Biomedicine 200 (2021) 105839, pp. 1-10 (Year: 2021).*
https://link.springer.com/article/10.1007/s00330-020-07594-y, Park Junghoan et al, "CT quantification of the heterogeneity of fibrosis boundaries in idiopathic pulmonary fibrosis", European Radiology, Jan. 13, 2021, vol. 31, No. 7, pp. 5148-5159, Springer Berlin Eidelberg, Berlin, 12 pages.
European Patent Office, European Search Report and Written Opinion for PCT/EP2023/053233, dated Nov. 25, 2023, 8 pages.
European Patent Office, European Search Report and Written Opinion for EP 4 22315034.3, dated Jul. 31, 2022, 6 pages.
European Patent Office, International Preliminary Report and Written Opinion on Patentability for PCT/EP2023/053233, dated Aug. 20, 2024, 7 pages.
Choi, et al., "Reproducible and Interpretable Spiculation Quantification for Lung Cancer Screening," Computer Methods and Programs in Biomedicine (Oct. 16, 2020), 18 pages.
Leonardi et al., "Multiple reconstruction and dynamic modeling of 3D digital objects using a morphing approach," 12 pages.

* cited by examiner

APPARATUSES AND METHODS FOR TRAINING AND USING COMPUTATIONAL OPERATIONS FOR DIGITAL IMAGE PROCESSING

CROSS-REFERENCE TO RELATED APPLICATIONS

This application is a continuation of International Application No. PCT/EP2023/053233, filed on Feb. 9, 2023, which claims priority to European Patent Application No. 22315034.3, filed on Feb. 18, 2022, and titled "Method and System for Computer Aided Diagnosis Based on Morphological Characteristics Extracted from 3-Dimensional Medical Images." The entirety of the aforementioned applications is hereby incorporated by reference for all purposes.

SUMMARY

According to one embodiment, a method for training at least one computing operation using 3-dimensional images and using at least one trained computing operation on an input 3-dimensional image comprises: receiving, from a first geographical location, at a first time, using one or more hardware computing device processors, a first image comprising a first 3-dimensional image displaying at least one detectable structure, wherein the at least one detectable structure comprises at least one quantifiable visual feature; determining, using one or more hardware computing device processors, based on the first image, the at least one detectable structure; segmenting, using the one or more hardware computing device processors, the first image to obtain a first segmentation mask, wherein the first segmentation mask is associated with at least one geometric shape and comprises the at least one quantifiable visual feature; generating, using the one or more hardware computing device processors, based on the first segmentation mask, a first mesh based on or comprising the at least one quantifiable visual feature, wherein the first mesh is associated with a first surface, wherein the first surface is associated with a first set of vertices; geometrizing the first mesh, based on a first geometric parameter, thereby resulting in a first geometrized mesh; computing or determining, using the one or more hardware computing device processors, at least one first quantifiable visual parameter based on the first mesh; extracting, using the one or more hardware computing device processors, a first quantifiable visual data from the first image based on the at least one first quantifiable visual parameter; training the at least one computing operation using the first quantifiable visual data as a first input; receiving, from the first geographical location or a second geographical location, at the first time or a second time, using one or more hardware computing device processors, a second image comprising a second 3-dimensional image displaying the at least one detectable structure, wherein the at least one detectable structure comprises the at least one quantifiable visual feature; determining, using one or more hardware computing device processors, based on the second image, the at least one detectable structure; segmenting, using the one or more hardware computing device processors, the second image to obtain a second segmentation mask, wherein the second segmentation mask is associated with the at least one geometric shape and comprises the at least one quantifiable visual feature; generating, using the one or more hardware computing device processors, based on the second segmentation mask, a second mesh based on or comprising the at least one quantifiable visual feature, wherein the second mesh is associated with a second surface, wherein the second surface is associated with a second set of vertices; geometrizing the second mesh, based on the first geometric parameter or a second geometric parameter, thereby resulting in a second geometrized mesh; computing or determining, using the one or more hardware computing device processors, at least one second quantifiable visual parameter for the second mesh; extracting, using the one or more hardware computing device processors, a second quantifiable visual data from the second image based on the at least one second quantifiable visual parameter; training the at least one computing operation using the second quantifiable visual data as a second input; receiving, from the first geographical location, the second geographical location, or a third geographical location, at the first time, the second time, or a third time, using the one or more hardware computing device processors, a third image comprising a third 3-dimensional image displaying the at least one detectable structure, wherein the at least one detectable structure comprises the at least one quantifiable visual feature; determining, using the one or more hardware computing device processors, based on the third image, the at least one detectable structure; segmenting, using the one or more hardware computing device processors, the third image to obtain a third segmentation mask, wherein the third segmentation mask is associated with the at least one geometric shape and comprises the at least one quantifiable visual feature; generating, using the one or more hardware computing device processors, based on the third segmentation mask, a third mesh based on or comprising the at least one quantifiable visual feature, wherein the third mesh is associated with a third surface, wherein the third surface is associated with a third set of vertices; geometrizing the third mesh, based on the first geometric parameter, the second geometric parameter, or a third geometric parameter, thereby resulting in a third geometrized mesh; computing or determining, using the one or more hardware computing device processors, at least one third quantifiable visual parameter for the third mesh; extracting, using the one or more hardware computing device processors, a third quantifiable visual data from the third image based on the at least one third quantifiable visual parameter; training the at least one computing operation using the third quantifiable visual data as a third input; receiving, from a fourth geographical location that is different from all of the first geographical location, the second geographical location, and the third geographical location, at a fourth time that is different from all of the first time, the second time, and third time, using the one or more hardware computing device processors, a fourth image comprising a fourth 3-dimensional image displaying the at least one detectable structure; determining, using the one or more hardware computing device processors, based on the fourth image, the at least one detectable structure; segmenting, using the one or more hardware computing device processors, the fourth image to obtain a fourth segmentation mask, wherein the fourth segmentation mask is associated with the at least one geometric shape and comprises the at least one quantifiable visual feature; generating, using the one or more hardware computing device processors, based on the fourth segmentation mask, a fourth mesh comprising the at least one quantifiable visual feature, wherein the fourth mesh is associated with a fourth surface, wherein the fourth surface is associated with a fourth set of vertices; geometrizing the fourth mesh, based on the first geometric parameter, the second geometric parameter, the third geometric parameter, or a fourth geometric parameter, thereby resulting in a fourth geometrized mesh; computing or determining, using the one or more hardware computing device processors, at least one fourth quantifiable visual parameter for the fourth mesh; extracting, using the one or more hardware computing device processors, a fourth quantifiable visual data from the fourth image based on the at least one fourth quantifiable visual parameter; classifying, based on the training the at least one computing operation using the first quantifiable visual data as the first input, the training the at least one computing operation using the second quantifiable visual data as the second input, and the training the at least one computing operation using the third quantifiable visual data as the third input, using the one or more hardware computing device processors, the fourth quantifiable visual data, thereby resulting in a classification; generating, using the one or more hardware computing device processors, based on the classification, a computation result for the fourth image; and correlating, using the one or more hardware computing device processors, the computation result with a malignancy dataset associated with the at least one detectable structure, thereby resulting in correlation data.

BRIEF DESCRIPTION OF THE DRAWINGS

Reference will be made in detail to embodiments of the disclosure, non-limiting examples of which may be illustrated in the figures of the accompanying drawings. Some figures may be in the form of diagrams. Some elements in the figures may be exaggerated; others may be omitted, for illustrative clarity. Any text (legends, notes, reference numerals and the like) appearing on the drawings are incorporated herein by reference.

FIG. 2A and FIG. 2B (on the left) illustrate the probability distribution of the mean curvatures, respectively for the healthy liver and the advanced fibrosis stage liver.

FIG. 4A and FIG. 4B (on the left) illustrate the probability distribution of the mean curvatures, respectively for benign lung nodule and malignant lung nodule.

DETAILED DESCRIPTION

Figure 1:
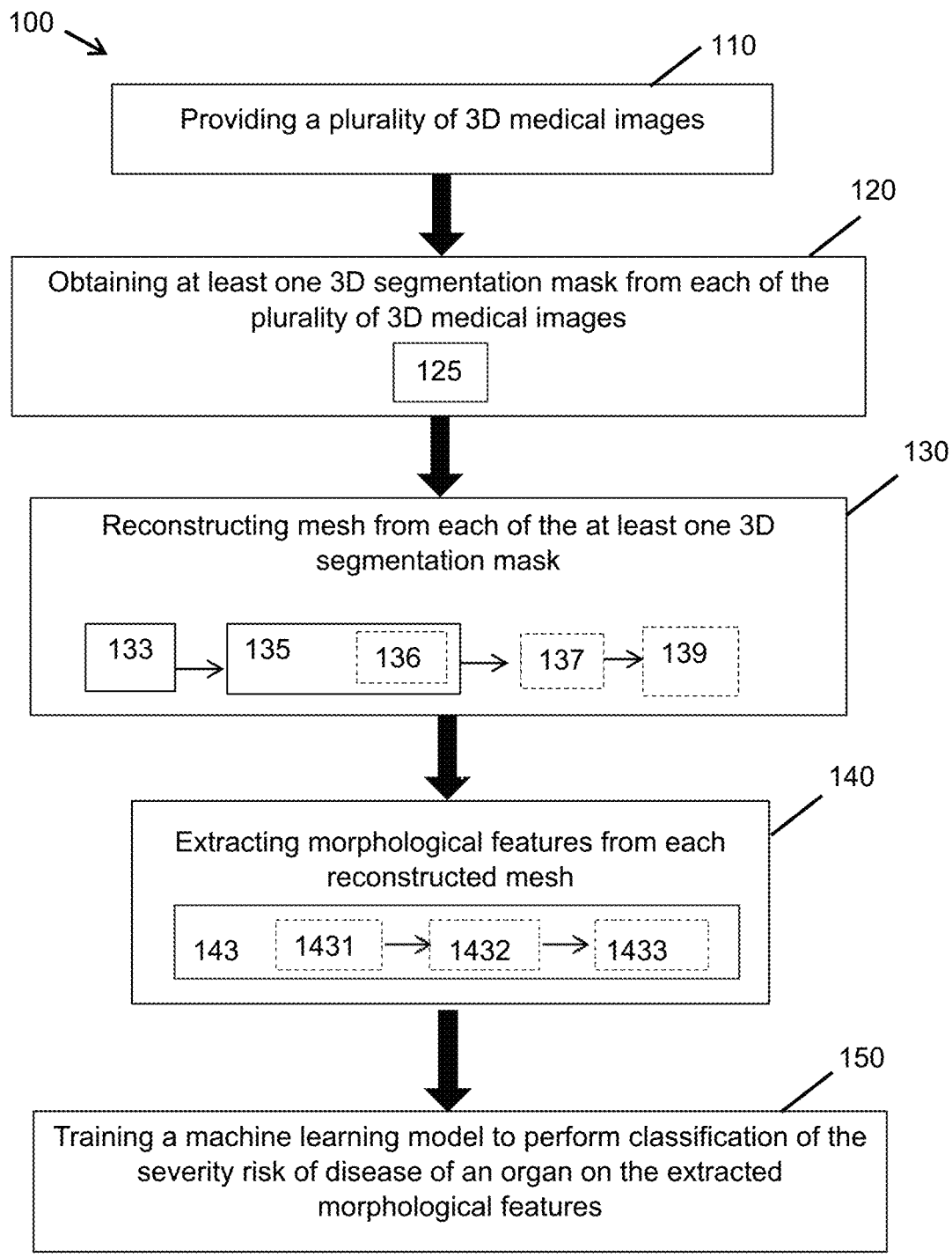
FIG. 1 is a flowchart according to some examples of the method according to the first aspect of the present disclosure.

According to one embodiment, a method for training at least one computing operation using 3-dimensional images and using at least one trained computing operation on an input 3-dimensional image comprises: receiving, from a first geographical location, at a first time, using one or more hardware computing device processors, a first image comprising a first 3-dimensional image displaying at least one detectable structure, wherein the at least one detectable structure comprises at least one quantifiable visual feature; determining, using one or more hardware computing device processors, based on the first image, the at least one detectable structure; segmenting, using the one or more hardware computing device processors, the first image to obtain a first segmentation mask, wherein the first segmentation mask is associated with at least one geometric shape and comprises the at least one quantifiable visual feature; generating, using the one or more hardware computing device processors, based on the first segmentation mask, a first mesh based on or comprising the at least one quantifiable visual feature, wherein the first mesh is associated with a first surface, wherein the first surface is associated with a first set of vertices; geometrizing the first mesh, based on a first geometric parameter, thereby resulting in a first geometrized mesh; computing or determining, using the one or more hardware computing device processors, at least one first quantifiable visual parameter based on the first mesh; extracting, using the one or more hardware computing device processors, a first quantifiable visual data from the first image based on the at least one first quantifiable visual parameter; training the at least one computing operation using the first quantifiable visual data as a first input; receiving, from the first geographical location or a second geographical location, at the first time or a second time, using one or more hardware computing device processors, a second image comprising a second 3-dimensional image displaying the at least one detectable structure, wherein the at least one detectable structure comprises the at least one quantifiable visual feature; determining, using one or more hardware computing device processors, based on the second image, the at least one detectable structure; segmenting, using the one or more hardware computing device processors, the second image to obtain a second segmentation mask, wherein the second segmentation mask is associated with the at least one geometric shape and comprises the at least one quantifiable visual feature; generating, using the one or more hardware computing device processors, based on the second segmentation mask, a second mesh based on or comprising the at least one quantifiable visual feature, wherein the second mesh is associated with a second surface, wherein the second surface is associated with a second set of vertices; geometrizing the second mesh, based on the first geometric parameter or a second geometric parameter, thereby resulting in a second geometrized mesh; computing or determining, using the one or more hardware computing device processors, at least one second quantifiable visual parameter for the second mesh; extracting, using the one or more hardware computing device processors, a second quantifiable visual data from the second image based on the at least one second quantifiable visual parameter; training the at least one computing operation using the second quantifiable visual data as a second input; receiving, from the first geographical location, the second geographical location, or a third geographical location, at the first time, the second time, or a third time, using the one or more hardware computing device processors, a third image comprising a third 3-dimensional image displaying the at least one detectable structure, wherein the at least one detectable structure comprises the at least one quantifiable visual feature; determining, using the one or more hardware computing device processors, based on the third image, the at least one detectable structure; segmenting, using the one or more hardware computing device processors, the third image to obtain a third segmentation mask, wherein the third segmentation mask is associated with the at least one geometric shape and comprises the at least one quantifiable visual feature; generating, using the one or more hardware computing device processors, based on the third segmentation mask, a third mesh based on or comprising the at least one quantifiable visual feature, wherein the third mesh is associated with a third surface, wherein the third surface is associated with a third set of vertices; geometrizing the third mesh, based on the first geometric parameter, the second geometric parameter, or a third geometric parameter, thereby resulting in a third geometrized mesh; computing or determining, using the one or more hardware computing device processors, at least one third quantifiable visual parameter for the third mesh; extracting, using the one or more hardware computing device processors, a third quantifiable visual data from the third image based on the at least one third quantifiable visual parameter; training the at least one computing operation using the third quantifiable visual data as a third input; receiving, from a fourth geographical location that is different from all of the first geographical location, the second geographical location, and the third geographical location, at a fourth time that is different from all of the first time, the second time, and third time, using the one or more hardware computing device processors, a fourth image comprising a fourth 3-dimensional image displaying the at least one detectable structure; determining, using the one or more hardware computing device processors, based on the fourth image, the at least one detectable structure; segmenting, using the one or more hardware computing device processors, the fourth image to obtain a fourth segmentation mask, wherein the fourth segmentation mask is associated with the at least one geometric shape and comprises the at least one quantifiable visual feature; generating, using the one or more hardware computing device processors, based on the fourth segmentation mask, a fourth mesh comprising the at least one quantifiable visual feature, wherein the fourth mesh is associated with a fourth surface, wherein the fourth surface is associated with a fourth set of vertices; geometrizing the fourth mesh, based on the first geometric parameter, the second geometric parameter, the third geometric parameter, or a fourth geometric parameter, thereby resulting in a fourth geometrized mesh; computing or determining, using the one or more hardware computing device processors, at least one fourth quantifiable visual parameter for the fourth mesh; extracting, using the one or more hardware computing device processors, a fourth quantifiable visual data from the fourth image based on the at least one fourth quantifiable visual parameter; classifying, based on the training the at least one computing operation using the first quantifiable visual data as the first input, the training the at least one computing operation using the second quantifiable visual data as the second input, and the training the at least one computing operation using the third quantifiable visual data as the third input, using the one or more hardware computing device processors, the fourth quantifiable visual data, thereby resulting in a classification; generating, using the one or more hardware computing device processors, based on the classification, a computation result for the fourth image; and correlating, using the one or more hardware computing device processors, the computation result with a malignancy dataset associated with the at least one detectable structure, thereby resulting in correlation data.

Pathologies systematically induce morphological changes, constituting a major but insufficiently quantified source of observables for diagnostic. In order to use the morphological characteristics for disease prediction, some proposals have been made to employ a quantitative method for measuring pathology, in particular, pathological deformations of organs or sub-tissue on medical images. Pathology may refer to the pathological features considered collectively, i.e. the typical observable symptoms of a disease. In the context of the present disclosure, pathological deformations of an organ or sub-tissue may be for example: liver surface nodularity, spiculated lung nodules, and may be extended to other types of deformations such as aneurysm rupture, exophytic kidney's tumor among other examples. U.S. Pat. No. 10,130,295 B2 as mentioned above proposes an image segmentation of the liver edge boundary (1D) on 2D images or 3D volumes, and then fits a 1-dimensional spline (a polynomial curve) to the detected liver boundary. The distance between the detected liver boundary and spline is measured on a pixel-by-pixel basis and is referred to as Liver Surface Nodularity Score (LNS). Larger distances correspond to larger surface nodularity scores—this way, the apparition of nodules on the surface is quantified (by LNS). However, given that the spline is fitted on a 2-dimensional image, it does not take profit of the whole 3-dimensional neighborhood information and morphology for extracting the morphological features. Moreover, the use of a direct correlation of the LNS score with the diagnosis of liver fibrosis or cirrhosis may not meet the performance expectations for the disease prediction. In lung tumor malignancy diagnostic, spiculations are important predictors of lung cancer malignancy, which are spikes on the surface while benign nodules are egg-shaped. In Choi W., et al.: *Reproducible and interpretable spiculation quantification for lung cancer screening*. Computer Methods and Programs in Biomedicine, Vol. 200 (2021), it is proposed to quantify spiculation by reconstructing a 3D mesh from a segmented mask of a nodule to conformally map it to a sphere.

Then, after measuring the area distortion of the conformal mapping, the largest negative variation in the area distortion is used as quantifier to identify spikes. A machine learning model (SVM-LASSO) is then used to predict the malignancy in nodules. However, both the quantifiers used by Choi et al. to characterize local deformations relying on a single scalar value, and their method of prediction of malignancy in lung nodules based on such quantifiers need to be improved.

It is proposed by CN patent no. 113066583A to predict aneurysm risk by reconstructing a 3D mesh from a segmented mask of the aneurysm and extracting morphological features from the mesh, these features are then used as input data in a machine learning model to the prediction. The morphological features are various ratios of distances such as the one between the maximum height value and the average size of the neck, the one between the maximum height value and the maximum width value, the one between the maximum width and the average neck size, and the one between the maximum height and the size of the parent vessel. However, the distance ratios can merely quantify all the possible local deformations or shape irregularities in a rough, partial and approximate manner and as a result can merely lead to low accuracy prediction.

The studies of Leonardi V., et al.: *Multiple reconstruction and dynamic modeling of 3d digital objects using a morphing approach, The Visual Computer*. Vol. 31 (June 2014) aims to detect cancer in the kidneys and propose to localize kidney exophytic tumors using a curvature-based approach on a surface mesh, either by maximum curvature or by recursive labelling of the vertices. However, the curvatures are extracted only for visualization purpose as the objective of Leonardi V., et al. is the application of 3-dimensional mesh to kidney animation and tumor tracking.

Furthermore, the few studies that introduced 3D methods using surface meshes of the organs proposed either extracting a single conformal mapping deformation parameter thus resulting in single and potentially poorly discriminative feature (Choi), or a recursive curvature labelling of the vertices which leads to a high dimensional feature thus being unsuitable for prediction using a machine learning model (Leonardi).

The present disclosure proposes to characterize the local pathological deformations as quantifiers, and then perform a precise prediction of disease based on those quantifiers, thus allowing to optimize the performance on the prediction of the severity of disease evaluated for example by the AUC-ROC score. AUC-ROC is one of the most important evaluation metrics for measuring the classification performance. AUC-ROC score ranges in value from 0to 1. Higher the AUC-ROC, the better the model is at distinguishing between two classes. For multi-class classification, using the one vs. all methodology, we can plot as many ROC curves as the number of classes. For example, for the characterization of liver fibrosis stage F0, F1, F2, F3, F4, we can have one ROC curve for F0 vs. (F1-F4), one for F1 vs (F0, F2-F4), one for F2 vs. (F0-F1, F3-F4), one for F3 vs. (F0-F2, F4) and one for F4 vs. (F0-F3). In this case, the AUC-ROC score can be calculated by the one-vs-rest (OvR) algorithm which computes the average of the ROC-AUC scores for each class against all other classes.

The disclosure proposed here aims to take advantage of the 3-dimensional morphological characteristics by extracting specific morphological features that quantify local deformations and developing a method of morphological classification based on the extracted features. In geometry, curvature is the degree to which a curve deviates from a straight line, or a curved surface deviates from a plane. There are positive curvature and negative curvature. A surface has positive curvature at a point if the surface curves away from that point in the same direction relative to the tangent to the surface, regardless of the cutting plane. A surface has negative curvature at a point if the surface curves away from the tangent plane in two different directions. The Gauss-Bonnet Theorem states that the Gaussian curvature of a surface, being intrinsic property of a surface, does not change if one bends the surface without cutting or adding holes on it, and in this sense is a topological invariant. Taking an example of a sphere and deforming it into a liver, if we compute the integral over the curvatures, it will be the same for the sphere as to its deformed version, being a liver. Here, liver, having a surface without boundaries nor topological holes is homeomorphic to a sphere (i.e. a closed surface without topological holes), for which the Theorem says that the integral over the curvatures is equal to 2 times pi times the Euler characteristic.

Advantageously, the present method proposes to extract not only the sum of all local curvatures but also their distribution across the liver surface, thus the extracted features convey the information of all deformations (except torsion) rather than being invariant to them. In the same example, although the integral over the curvatures remains the same for the sphere and the liver, due to the local deformation which has "transformed" the sphere into the liver, the distribution of curvatures of the sphere and of the liver are different. In this example, the liver with bumps and saddles on its surface i.e. local deformations may have several negatives and positives curvatures respectively while the sphere will have zero negative curvatures. On the same principle, the distributions of curvatures of a healthy liver and a cirrhotic one should be different. The energy given by the integral of the absolute value of the curvature of those two shapes will also be different. Advantageously, in the context of the present disclosure, those differences can be used to facilitate distinguishing anatomical structures with different pathological deformations. It is thus advantageous to use the distribution of curvatures to characterize the local deformations. Using the distribution of curvatures as morphological features is particularly advantageous for prediction of disease in that quantifying local pathological deformations using the distribution of curvatures allows to differentiate regular surface from a surface with shape irregularities, for example wavy forms of liver fibrosis and spikes presented as lung nodules.

In order to take advantage of the 3-dimensional morphological characteristics obtained from 3-dimensional medical images, the present disclosure proposes to segment each 3-dimensional medical image to obtain at least one 3-dimensional segmentation mask and reconstruct mesh from each 3-dimensional segmentation mask. Each 3-dimensional segmentation mask comprises at least one anatomical structure. The term "segmentation" refers to a process of partitioning at least one 3-dimensional medical image into multiple anatomical regions (sets of voxels, also known as image objects). In the context of the present disclosure, the segmentation refers to, for each 3-dimensional medical image, generating one segmentation mask which comprises at least one anatomical structure.

An "anatomical structure" is any biological entity that occupies space and is distinguished from its surroundings. In the context of the present invention, an anatomical structure can be for example an organ, muscle, soft tissue, arteries, veins, bone, sub-tissue and so on. Examples of organs may be liver, spleen, lung and so on. Examples of sub-tissues may be tumor, which is an abnormal growth of body tissue, such as lung nodules. Tumors can be cancerous (malignant) or non-cancerous (benign). An additional example of sub-tissues may be aneurysm, which is a bulge that forms in the thinning wall of an artery, such as cerebral aneurysm and thoracic aortic aneurysms. It is to be noted that the present invention does not limit the anatomical structure to the listed examples.

It is to be appreciated that in the context of the present invention, curvatures as being extracted from the reconstructed mesh, refer to the degree to which a curve deviates from a straight line and are expressed by a numerical quantity. For example, a curvature, namely the gaussian curvature or the mean curvature at a point (vertex) is a scalar value. In other words, by reconstructing a mesh of the boundaries of the 3-dimensional segmentation of the organ or sub-tissue, and then by extracting morphological features from the reconstructed mesh, the morphological features are computed on the geometrized mesh and correspond to certain topological invariant such as the Gaussian curvature (in the sense of Bonnet-Gauss theorem or of isometric diffeomorphism invariance), or correspond to the mean curvature, or correspond to other functions for differentiating pits from peaks, or convex from concave, or ridges from valleys, thus allowing to make the maximum use of the 3-dimensional morphological information obtained from the 3-dimensional medical images to characterize the local pathological deformations.

The present disclosure proposes to use curvature to characterize local deformation of the boundaries of organs or sub-tissues, then calculate the distribution of these curvatures, which can be used to generate machine learning model for a statistically quantified prediction of the severity of disease with high accuracy. Two examples applying the proposed solution are provided for clinical prediction namely on the liver fibrosis stage and on the lung nodules malignancy. Furthermore, the present disclosure proposes to train a machine learning model on the extracted morphological features to perform classification of the severity risk of disease from a plurality of 3-dimensional medical images. Advantageously, the machine learning model is a supervised classifier model, preferably a decision-tree based classifier. In some examples, Random forest or XGboost model may be used.

In the context of the present disclosure, the severity risk of disease may correspond to binary classification or multi-class classification. In case of binary classification, the present disclosure is applicable to the diagnosis of the stage of liver fibrosis, namely, to differentiate between the early stage (F0 to F2) and late stage (F3 to F4). In case of binary classification, the present disclosure is applicable to the diagnosis of lung nodule, namely, to differentiate between benign and malignant. In case of multi-class classification, the present disclosure is applicable to the diagnosis of the multiple stages (F0 to F4) of liver fibrosis.

The present disclosure proposes to apply the generated machine learning model to perform classification for each candidate image of a plurality of 3-dimensional medical images. FIG. 1 shows a flowchart according to some examples of the method according to the first aspect of the present disclosure. With reference to FIG. 1, a method 100 is shown for generating a machine learning model for prediction of the severity risk of disease from a plurality of 3-dimensional medical images. As noted previously, in the context of the present disclosure, an anatomical structure can be for example an organ, muscle, soft tissue, arteries, veins, bone, sub-tissue and so on. Whilst the applications of present disclosure are discussed in the context of liver and lung, it will be appreciated that the applications may be extended to organs other than liver and lung, such as spleen.

It is to be appreciated that whilst the applications are disclosed in the context of liver fibrosis and lung nodules, a disease in the context of the present disclosure, may manifest in a defined anatomical structure, and may not be limited to tumor, be it cancerous or not, neither be limited to liver or lung. In the context of the present disclosure, the anatomical changes due to disease may take any shape as long as it has local deformations, whether it be spike or bump, concave or convex. Furthermore, the anatomical changes may be in the form of a disconnection of the tissue such as ruptures or holes, and so forth.

It is to be appreciated that in the context of the present disclosure, "a plurality of" refers to at least three, as the number of images of the minimum sampling size to train a successful machine learning model. That is, at least three 3-dimensional medical images are to be provided for generating a machine learning model for the prediction of the severity risk of disease. The phrase "a plurality of" is interchangeable with the phrase "a set of" in the context of the present disclosure, given that the latter meets the same requirement of the number of images. In the context of the present disclosure, it is assumed that among the plurality of images, there are at least three images being different from each other. The 3-dimensional medical images may be CT and/or MRI images. The method as proposed by the present disclosure is not limited to the manner how an 3-dimensional medical images may be obtained.

The method for obtaining the 3D medical images may apply indifferently to any MRI or CT imaging including with contrast agent or without contrast agent, namely:
Computed Tomography (CT) scanning of a patient with and without a contrast agent injected prior to the scanning, and
Magnetic resonance imaging (MRI), with or without a contrast agent injected prior to the scanning, for whatever sequence acquisition or reconstruction process.

In the context of the present disclosure, 3-dimensional images can be referred to as "volume images". In some examples, each 3-dimensional medical image refers to an entire or part of a 3-dimensional medical image.

As shown in FIG. 1, the method 100 comprises a step 110 of providing a plurality of 3-dimensional medical images, and each image of the plurality of 3-dimensional medical images comprises at least one anatomical structure of a patient. It is to be noted that the at least one anatomical structure may be relevant for prediction of the severity risk of a disease.

In the context of the present disclosure, although it is required that at least three images are provided being different one from each other, it is not required that two different images be from different patients. In other words, the present disclosure does not require the variety of images to be associated with the variety of patients.

As shown in FIG. 1, the method 100 may further comprises, after the step 110 of providing a plurality of 3-dimensional medical images, a step 120 of obtaining at least one 3-dimensional segmentation mask from each image of the plurality of 3-dimensional medical images, each mask of the at least one 3-dimensional segmentation mask may comprise at least one anatomical structure.

It is to be appreciated that in the context of the present disclosure, where a 3-dimensional segmentation mask "comprises" a least one anatomical structure, the term "comprise" is interchangeable with the term "delimit", both may have a meaning of determining the boundary of the at least one anatomical structure.

In some examples, the step 120 of obtaining at least one 3-dimensional segmentation mask from each image of the plurality of 3-dimensional medical images may comprise a step 125 of segmenting each image of the plurality of 3-dimensional medical images so that at least one 3-dimensional segmentation mask is generated for each 3-dimensional medical image and each mask comprises at least one anatomical structure.

In some examples, one 3-dimensional medical image comprises or corresponds to at least one 3-dimensional segmentation masks. In some examples, one 3-dimensional segmentation mask comprises or corresponds to at least one anatomical structure. In the context of the present disclosure, it is required that each image of the plurality of 3-dimensional medical images being provided for generating the machine learning model for prediction of the severity risk of disease comprise at least one anatomical structure. Thus, the segmentation of an anatomical structure may allow the prediction of the severity risk of a disease to be performed in relation to the segmented anatomical structure.

The segmentation mask may comprise at least one segmented anatomical structure without being limited to the following examples:
At least one organ, such as liver, lung and spleen;
At least a tumor, such as liver fibrosis;
The combination of organ and tumor such as liver fibrosis, or lung with nodules.

In some examples, in order to facilitate the post-processing, one segmentation mask may be further divided into at least one segmentation mask as long as each segmentation mask comprises at least one anatomical structure. The present disclosure does not limit how a 3-dimensional medical image can be segmented.

In some examples, the 3D segmentation of the organ or tissue may be obtained by automatically segmenting the organ or tissue using deep supervised convolutional neural network. In some examples, the 3D segmentation may be obtained by semi-automatic or manual segmentation. It is to be understood that if an automatic segmentation method is deployed in the present method, this may advantageously lead to an automatic prediction. It is to be noted that if manual or unsupervised segmentations are inputted, they might be compatible with the following steps of the present method. However, the prediction would not be automatic.

Still referring to FIG. 1, the method 100 may further comprises a step 130 of reconstructing mesh from each of the at least one 3-dimensional segmentation mask.

By "mesh", it is meant a discrete surface of the boundary of a volume, where the volume may be expressed in voxels, i.e. a set of voxels of a region of interest. Said region of interest may for example be defined by a segmentation mask. A segmentation mask is usually a set of pixels in 2D or a set of voxels in 3D which are set to 1 for representing a region of interest whereas other pixels or voxels outside of the region of interest are set to 0. By "reconstructing" a mesh from a 3-dimensional mask, it is meant that we make an
approximation of the surface of a volume mask. In an example where a liver being the organ of interest, with the volume of the liver being expressed in voxels, we may reconstruct the surface in mesh of the liver. Based on the reconstructed mesh, morphological features are extracted and used for training a machine learning model.

In some examples, the step 130 of reconstructing mesh from each 3-dimensional segmentation mask may comprise a step 133 of extracting a mesh from the 3-dimensional segmentation mask, then a step 135 of simplifying each reconstructed mesh, followed by a step 137 of smoothing the simplified reconstructed mesh.

The step 130 of reconstructing mesh from each 3-dimensional segmentation mask may further comprise, after reconstructing 130 and before extracting 140, a step 139 of light smoothing, in order to close the holes on the simplified mesh.

In some other examples, the step 139 is carried out after the step 137 of smoothing which follows the step 135 of simplification. In some further examples, the step 139 uses the Poisson reconstruction algorithm.

In fact, the holes may be caused by previous inappropriate segmentation. Although due to those holes, the mesh will not be watertight, such defects may be resolved by the step 139 for closing those holes. However, while closing the holes, the loss of physiological or morphological features (such as bumps and other disease in the form of local deformations) may be inevitable by the Poisson reconstruction which allows to reconstruct a surface from a given point cloud. After balancing pros and cons, the step 139 of light smoothing may be optional. The optional aspect of this aspect is depicted on FIG. 1 by the fact that the concerned block is in dashes. In some examples, the step 139 may be omitted from the method 100. It is to be noted that omitting the step 139 will not decrease the AUC-ROC score.

Step 133: Extracting a Mesh from the 3-Dimensional Segmentation Mask

As noted previously, in the context of the present disclosure, the step 133 of extracting mesh from a 3-dimensional segmentation mask (3-dimensional volume) refers to approximating a surface from a volume segmentation mask.

In some examples, the step 133 may be achieved by an algorithm which extracts a mesh from a 3D volume segmentation mask, for example, the Marching Cube and its improvements. The Marching Cube algorithm is based on a division of the input volume into a set of discrete cubes. In some examples applying the Marching Cube algorithm, the volumes are given by the binary 3-dimensional segmentation mask of the organ. The algorithm then performs the triangulation according to a lookup table of fifteen cube configurations for each cube crossed by the iso-surface of the volume.

In some further examples, the Marching Cube of Lewiner is used in the step 133 to extract a mesh from a segmentation mask volume. It is advantageous to use the Marching Cube of Lewiner in the present method as it may resolve topological inconsistencies brought by the Marching Cube algorithm by reconstructing the volume with tetrahedra. Using the Marching Cube of Lewiner may thus resolve ambiguities and guarantees topologically correct results.

Step 135: Simplifying Each Reconstructed Mesh

In some examples, the reconstructed mesh is then simplified in order to remove inconsistencies or degeneracies, such as duplicate vertices, duplicated faces, and zero area faces.

In some further examples, the step 135 of simplification may further improve triangles quality by
collapsing short edges and splitting long edges.

In some examples, where the Poisson reconstruction algorithm is used, the combination of the step 135 of simplification and the step 139 of light smoothing may have the following advantage: since the Poisson reconstruction algorithm is highly dependent on vertices normal, the removal of degeneracies and ambiguities by the step 135 beforehand will help to better estimate normal and thus achieving a geometrically more accurate mesh by closing the holes with the Poisson reconstruction algorithm.

In some examples, the step 135 of simplifying the reconstructed mesh may further comprise a step 136 of tuning the number of iterations of the simplification 135. The step 136 may be optional. The optional aspect of this aspect is depicted on FIG. 1 by the fact that the concerned block is in dashes.

In fact, a common outcome of the step 133 using Marching Cube algorithm with medical images is Z-sampling artifacts. Such artifacts are undesirable as they may generate noise when computing the morphological features such as curvatures, in turn making it challenging to detect physiological features. However, a higher number of iterations will reduce z-sampling artifacts but fail to preserve the details of the surface.

In some examples, the mesh is simplified n times to slightly reduce those artifacts while preserving details of the surface, with n<=10. Advantageously, tuning he number of iterations of the simplification against the diagnostic prediction metric (for example AUC-ROC) will allow to reach optimal signal-to-noise ratio while preserving some of the important physiological and/or pathological features present on the mesh, such as small bumps, local deformations of the surface due to a disease. In fact, by smoothing the mesh once again with Poisson reconstruction, those small bumps may be attenuated.

Step 137: Smoothing the Simplified Reconstructed Mesh

In some examples, the step 130 of reconstructing may comprise the step 137 of smoothing after the step 135 of simplifying the reconstructed mesh. The step 137 of smoothing allows to detect and remove the artifacts. It is to be noted that the step 137 of smoothing may be optional. The optional aspect of this aspect is depicted on FIG. 1 by the fact that the concerned block is in dashes.

In some examples, in order to attenuate the high-frequency content expected to be mainly due to medical images acquisition artefacts, two smoothing methods are proposed which can preserve the topology of the simplified mesh, namely Laplacien smoothing or Taubin smoothing. Between these two methods, Taubin smoothing gives better results than the Laplacian smoothing. This is because after an excessive number of iterations on the Laplacian smoothing, a shrinkage of the mesh and a deformation of the mesh will occur. In addition, the excessive number of iterations may also lower the AUC-ROC score. On the contrary, the Taubin smoothing can preserve the global aspect of the mesh without any risk of shrinkage of the mesh. In the context of the present disclosure, either method may be adopted for the step 137 of smoothing.

In some other examples, Anisotropic smoothing may be used, which smoothing has been tested to be more efficient in removing the z-artifacts than Laplacien or Taubin smoothing. In the context of the present disclosure, Anisotropic smoothing may be used to detect z-sampling artifacts and remove them by smoothing the mesh. More advantageously, Anisotropic smoothing allows to removes z-sampling artifacts without erasing features.

In some further examples, Anisotropic smoothing may comprise other computation methods allowing detection and removal of the artifacts.

In some further examples, Anisotropic smoothing may use Laplacien or Taubin smoothing, preferably Taubin smoothing, combined with other computational methods to remove z-sampling artifacts.

In some examples, depending on the anatomical structure comprised in the segmentation mask, the smoothing method may be chosen among: anisotropic smoothing and/or Laplacian, or anisotropic smoothing and/or Taubin smoothing.

In the case where the segmentation mask comprises liver fibrosis, anisotropic smoothing may be used as it remove Z-sampling artifacts and conserve physiological or pathological features. In the case where the segmentation mask comprises lung nodules, either Laplacian or Taubin smoothing may be used because the small-sized nodules may have artifacts in all directions, rather than only in Z-direction.

It is to be appreciated that in the context of the present disclosure, "reconstructed mesh" may refer to the mesh following the step 133 of extracting mesh from 3-dimensional segmentation mask, may refer to the mesh following the step 135 of simplifying the reconstructed mesh i.e. simplified reconstructed mesh, and may refer to the mesh following the step 137 of smoothing the simplified reconstructed mesh. If step 139 for closing holes is applied, the "reconstructed mesh" may further refer to the mesh following all the steps 133, 135, 137 and 139.

In some examples, "reconstructed mesh" refers to the mesh being prepared for the next step 140 of extracting morphological features from each reconstructed mesh as shown in FIG. 1. The step 140 will be described in detail below. As noted previously, in the context of the present disclosure, "morphological features" refer to geometrical or topological invariants. In some examples, the morphological features comprise a distribution of curvatures of the reconstructed mesh. As noted previously, curvatures are geometrical or topological invariants that can be used to quantify the local deformations. In some examples, curvatures are discrete curvatures of the reconstructed mesh. In those examples, the discrete curvatures may be obtained by discretizing continuous curvatures. The advantage of using discrete curvatures as compared to continuous curvatures is that computational time and resources may be greatly saved. In some further examples, Gaussian curvature or mean curvature is used as the discrete curvature.

In some examples, the step 140 of extracting morphological features may comprise a step 143 of computing the distribution of curvatures of the reconstructed mesh and the associated mesh's energy given by the formula: $E(M) = \int_M |K_G| dM$ where E denotes the energy, M denotes the manifold mesh, KG denotes the Gaussian curvature. The Energy is calculated as the sum of absolute value of curvatures over the whole mesh.

In some further examples, the step 143 of computing curvatures of the reconstructed mesh may comprise the following sub-steps:
- a sub-step 1431 of computing the mean curvature or gaussian curvature on the mesh,
- a sub-step 1432 of calculating the probability distribution of the mean curvature or Gaussian curvature over the mesh, and
- a sub-step 1433 of binning the probability distribution to distribution histograms.

The sub-step 1431 of computing discrete mean or Gaussian curvatures requires to have a manifold mesh, as curvature is not defined for non-manifold vertices. In fact, a mesh is manifold if every edge in the mesh is either a boundary edge or a manifold edge. A manifold edge is part of exactly two faces for surfaces. A boundary edge is part of exactly one face. A vertex is manifold if starting from an adjacent face of the vertex, all the other adjacent faces of the vertex can be accessed (by face displacement). In some examples, an approximation of the Steiner formula is used to compute the mean curvature or gaussian curvature on the mesh.

In some examples, at the sub-step 1433, the probability distribution of the mean curvature or the Gaussian curvature is binned in preferably 10 range-values. It is to be appreciated that in the context of the present disclosure, bins are used to categorize curvatures, between negative curvatures and positive curvatures.

Preferably, the number of bins may be set to 10, because it strikes good balance between restricting the dimension of the analysis and preserving the curvature distribution information. Therefore, 10 may be the number of bins being used as an appropriate bin size to cover the whole range of curvature data. In other examples, the number of bins can be arbitrarily greater or smaller than 10. The number of bins can be chosen depending on the sample size of the data: bigger the sample size it is, larger the number of bin may be, as the necessary effort to make in order to avoid the curse of dimensionality.

Figure 2A:
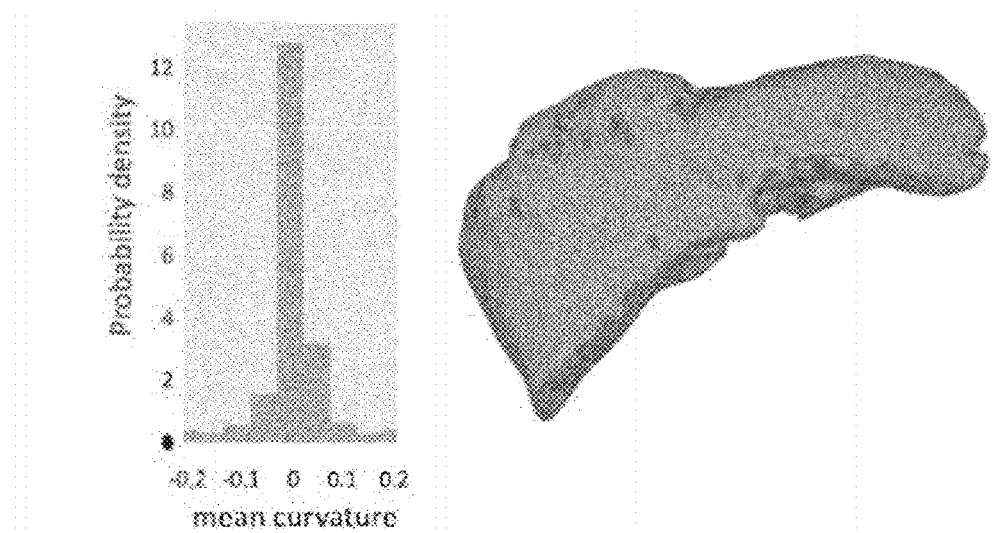
FIG. 2A and FIG. 2B (on the right) illustrate the reconstructed mesh of a healthy liver (F0) and an advance fibrosis stage liver (F4) respectively, with the values of curvature at each vertex being color-coded.
Figure 2B:
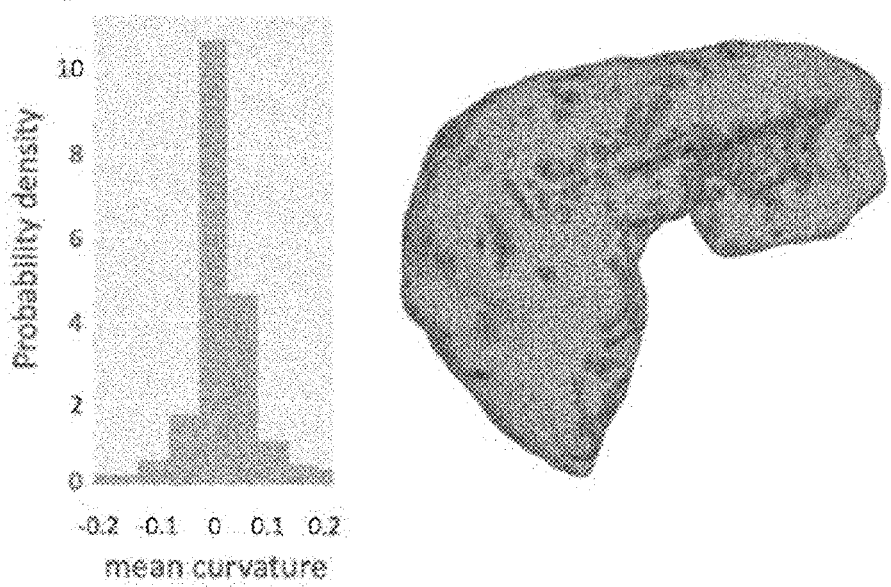

As described previously, the distributions of curvatures of the same organ with different pathologies (morphological deformations) may appear to be different, such as a healthy liver vs. a cirrhotic liver. FIG. 2A and FIG. 2B (on the right) illustrate the output of the 3D mesh reconstruction, i.e. reconstructed mesh of a healthy liver (F0) and an advance fibrosis stage liver (F4) respectively. The values of curvature are color encoded, where blue denotes local deformations with negative curvatures such as pits and/or valleys, red denotes local deformations with positive curvatures such as bumps and/or spikes, and green denotes local deformations with close-to-zero curvatures.

FIG. 2A and FIG. 2B (on the left) illustrate the probability distribution of their mean curvatures, respectively for a healthy liver and an advanced fibrosis stage liver.

In some further examples, the morphological features may further comprise baseline features, which may comprise at least one of the following features:
  a volume of an anatomical structure,
  the elongation of an anatomical structure,
  a min and/or max size of oriented bounding boxes of an anatomical structure, and
  an HPI mean of an anatomical structure.

In the above examples HPI stands for Hepatic Perfusion Index. It is defined as the ratio of the hepatic arterial to the sum of hepatic arterial blood flow and portal venous blood flow. In the above example, HPI mean refers to the average value of HPI across the whole liver volume. The advantage brought at least by using the distribution of curvatures as morphological features, as well as of using both the distribution of curvatures and the baseline features will be demonstrated in the following paragraphs based on an exemplary machine learning classifier and respectively on two exemplary applications namely liver fibrosis stage prediction and lung nodule malignancy prediction. Referring to FIG. 1, the method 100 further comprises a step 150 of training a machine learning model to perform classification of the severity risk of disease. In some examples, the training is performed on the extracted morphological features.

In some examples, the machine learning model is a supervised classifier model, In some further examples, the machine learning model is a supervised decision-tree based classifier, for example random forest or XGboost. The advantage of using Random forest or XGBoost classifier is that, it is the algorithm that chooses the function to separate the classes and the function can be non-linear.

In some examples where small sample size dataset is used for training, the Random Forest classifier is preferred. In some other examples where large sample size dataset is used for training, XGboost is preferred. Although not shown in FIG. 1, the method 100 may further comprise providing clinical information about each patient. In some examples, the step 150 of training is further performed on patient's clinical information. It is to be appreciated that in the context of the present disclosure, the term "patient's clinical information" refers to data about a patient which have been acquired by clinical examination. It may comprise at least one among: age, sex, height, weight, BMI, ethnic origin, medical conditions and risk factors of each patient.

Alternatively or in addition to said clinical information, the method 100 may further comprise extracting, from the plurality of 3-dimensional medical images as provided, other radiomics features than morphological ones, in order for the training to be further performed on said other radiomics features. Said other radiomics features may comprise at least one among: the state of the art library of radiomics provided by Van Griethuysen et al., comprising Haralick GLCM (Gray Level Co-occurrence Matrix), GLRLM (Gray Level Run Length Matrix), GLSZM (Gray Level Size Zone Matrix), NGTDM (Neighbouring Gray Tone Difference Matrix), GLDM (Gray Level Dependence Matrix) features, standard statistics of image grey level intensity features and classical morphology related features.

Example 1: Liver Fibrosis Stage Prediction

According to clinicians, an important task is to differentiate between early stages of fibrosis from F0 to F2 and late stages (F3, F4). Moreover, this early and late stages of fibrosis present important differences in nodularity level of the liver surface. The dataset used for fibrosis stage characterization contains 112 patients with their masks of the liver and spleen segmented from CT scans in the arterial phase using deep Convolutional Neural Networks, and with a fibrosis stage from F0 to F4 obtained by histology on biopsy. Within this dataset, 16% are F0, 4% are F1, 5% are F2, 12% are F3 and 63% are F4. For all these reasons, in particular given the small size of the samples and the unbalanced prevalence of fibrosis stages, it is not pertinent to perform a multi-class characterization of the fibrosis stage. Therefore, the prediction in Example 1 consists in a binary classification, pooling together F0 to F2 livers (25%) in one hand and F3, F4 livers (75%) on the other hand. The dataset is split in 50% for training, 50% for testing.

Figure 3A:
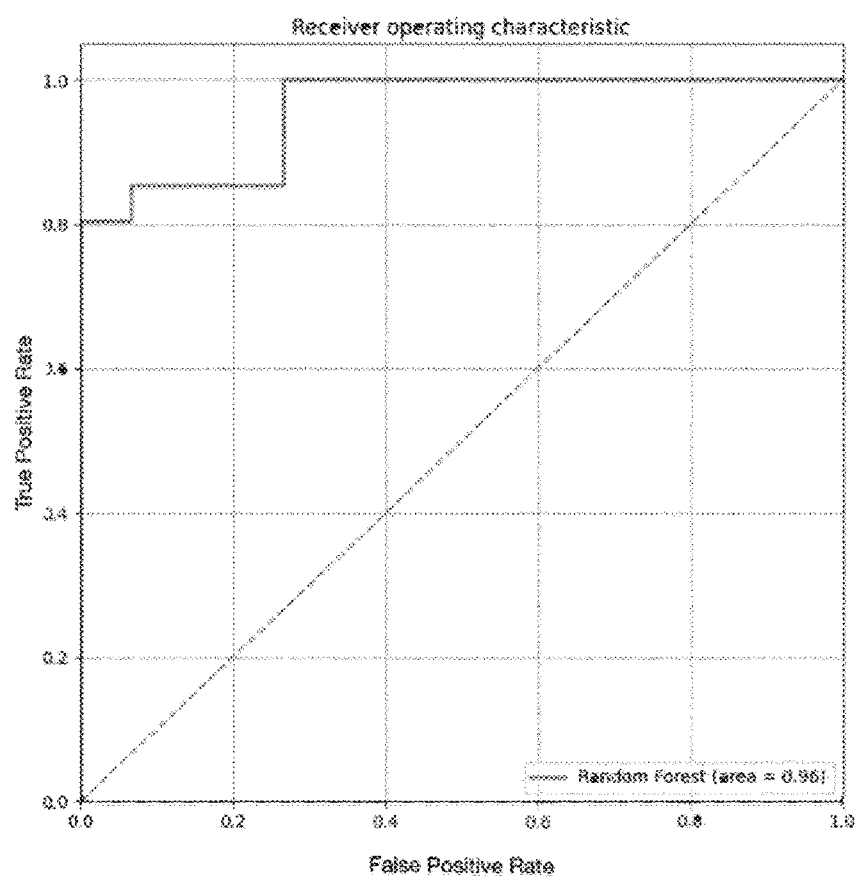
FIG. 3A and FIG. 3B show respectively the performance of the prediction model using Random Forest classification of F0-F2 vs. F3-F4 stages, and the predictive power of each feature.
Figure 3B:
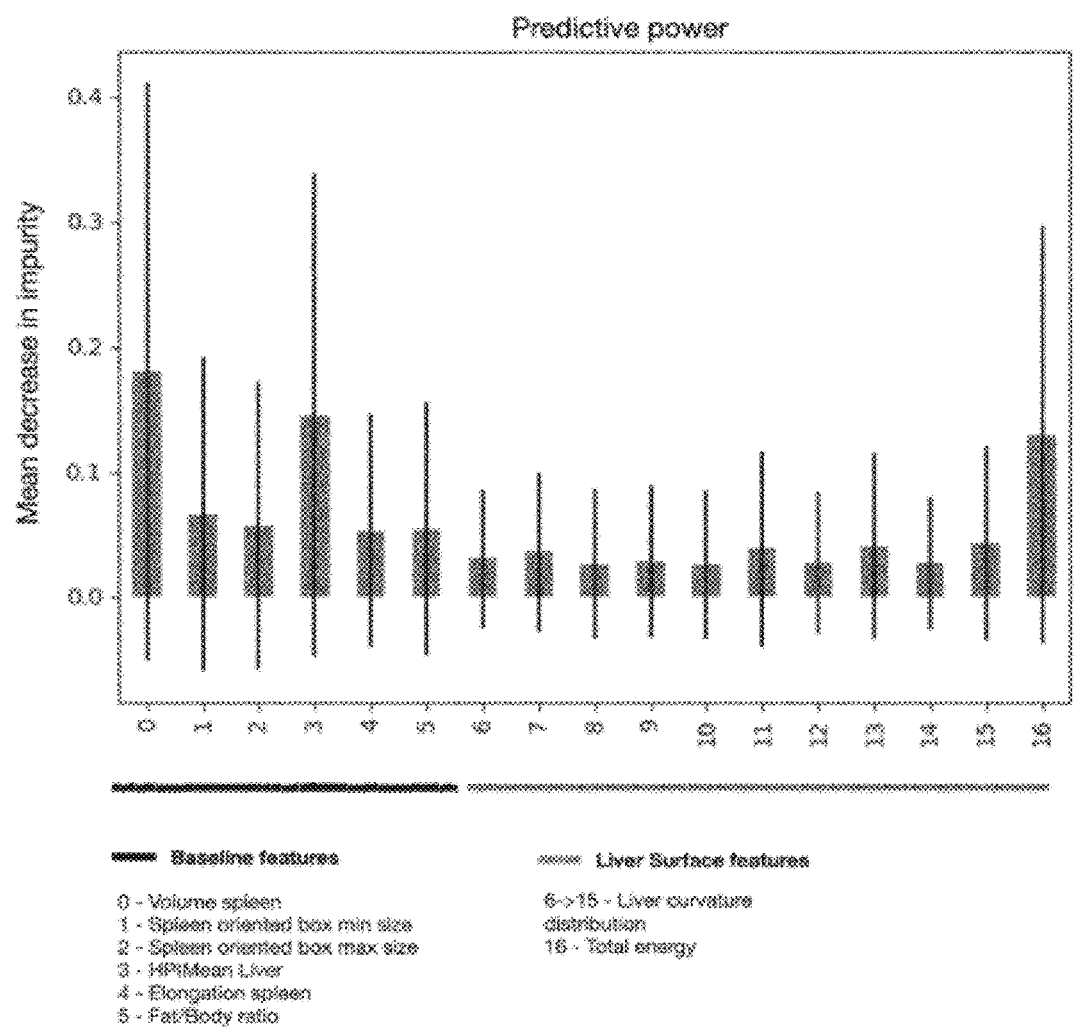

FIG. 3A and FIG. 3B show respectively the performance (indicated by ROC curve in blue) of the prediction model using Random Forest classification of F0-F2 vs. F3-F4 stages, and the predictive power of each feature. In FIG. 3B, the baseline features 0-5 are shown above a black solid line, whereas the liver surface features 6-16 (including the curvatures and mesh's energy) are shown above a blue solid line. The predictive power of each feature may be calculated using impurity-based feature importance method.

It is observed that using the baseline features only, the performance of the Random Forest Classifier is evaluated by an AUC-ROC score of 0.88. In the example chosen to use baseline features, the Random Forest Classifier has a minimum of 100 trees and a maximum of 300. The depth is set to 3, 5, 15, or 25. In some examples, the number of features to consider when looking for the best split is within 1 to 6. In some further examples, the minimum number of samples required to split an internal node is 3, 5, or 10.

In some other examples, using morphological features combining the baseline features with the curvature distribution and mesh's energy with the latter being obtained on masks segmented using deep-CNN where the number of simplification iterations is set to 10 and the number of Taubin smoothing iterations is set to 5, the AUC-ROC score is improved by 0.08, from 0.88 to 0.96.

Example 2: Lung Nodule Malignancy Prediction

The dataset consists in a small subset of NLST ("National Lung Screening Trial") cancer patients and healthy patient with nodules, containing 789 lung nodules annotated by clinicians and semi-automatically manual segmented, among which 79% are benign, and 21% are malignant.

As described previously, for lung nodules diagnosis, local deformations such as spiculations, which are spikes on the surface of a nodule, are well known to have an important predictive power upon the malignancy of nodule whereas "roundness" and smooth boundaries usually indicates that the lesion is benign.

Figure 4A:
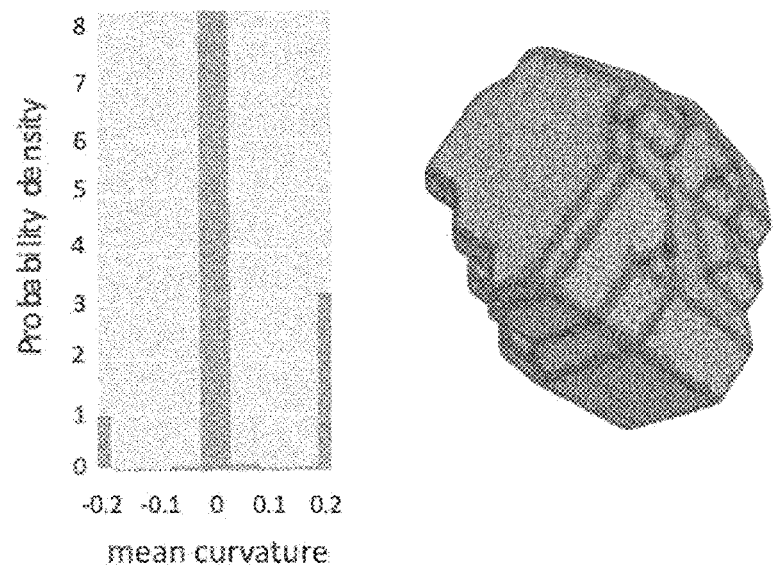
FIG. 4A and FIG. 4B (on the right) illustrate the reconstructed mesh of benign lung nodule and malignant lung nodule respectively, with the values of curvature at each vertex being color-coded.
Figure 4B:
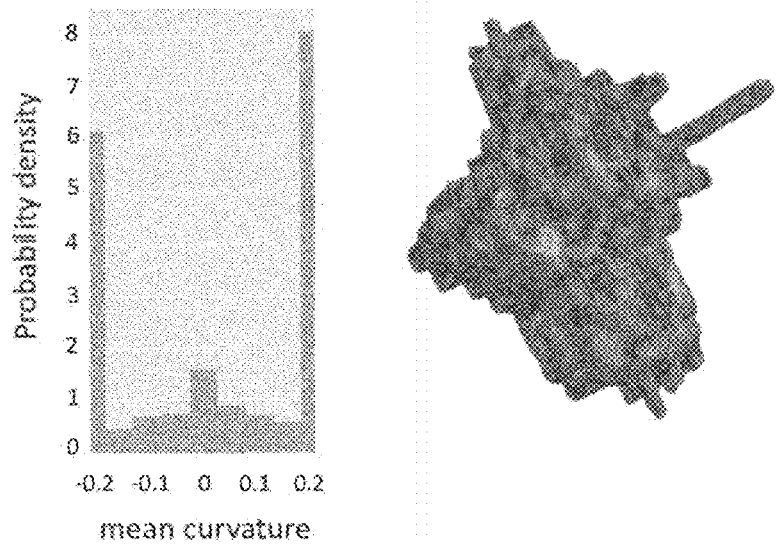

Advantageously, curvature is used to quantify these local deformations which will allow to differentiate regular surfaces from spiculated surfaces. The present method replaces the usual qualitative and subjective clinician judgements by morphological features such as curvatures. FIG. 4A and FIG. 4B (on the right) illustrate the output of the 3D mesh reconstruction, i.e. reconstructed mesh of benign lung nodule and malignant lung nodule respectively. The values of curvature are color encoded, where blue denotes local deformations with negative curvatures such as pits and/or valleys, red denotes local deformations with positive curvatures such as bumps and/or spikes, and green denotes local deformations with close-to-zero curvatures.

FIG. 4A and FIG. 4B (on the left) illustrate the probability distribution of their mean curvatures, respectively for benign lung nodule and malignant lung nodule. As illustrated in FIG. 4A and FIG. 4B, malignant and benign lesions typically exhibit different curvature distributions, with an overrepresentation of high absolute values of curvatures in malignant nodules. In this example, meshes are reconstructed without using Poisson reconstruction. Similar to FIG. 2A and FIG. 2B, FIG. 4A and FIG. 4B (on the right) display the meshes of all organs with their various possibilities of mean or Gaussian curvature or derived morphological features color coded on each faces, their probability distribution, and the clinical information of the patient.

Figure 5:
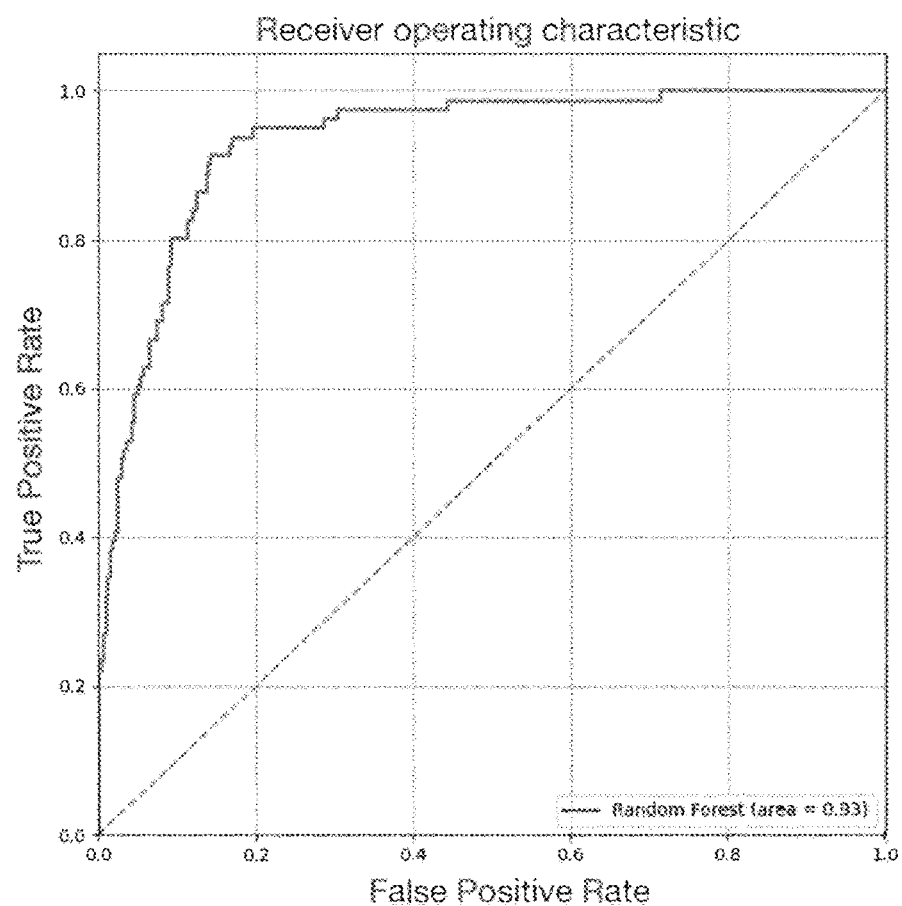
FIG. 5 shows the performance of the malignancy prediction using curvature features only.
Figure 6:
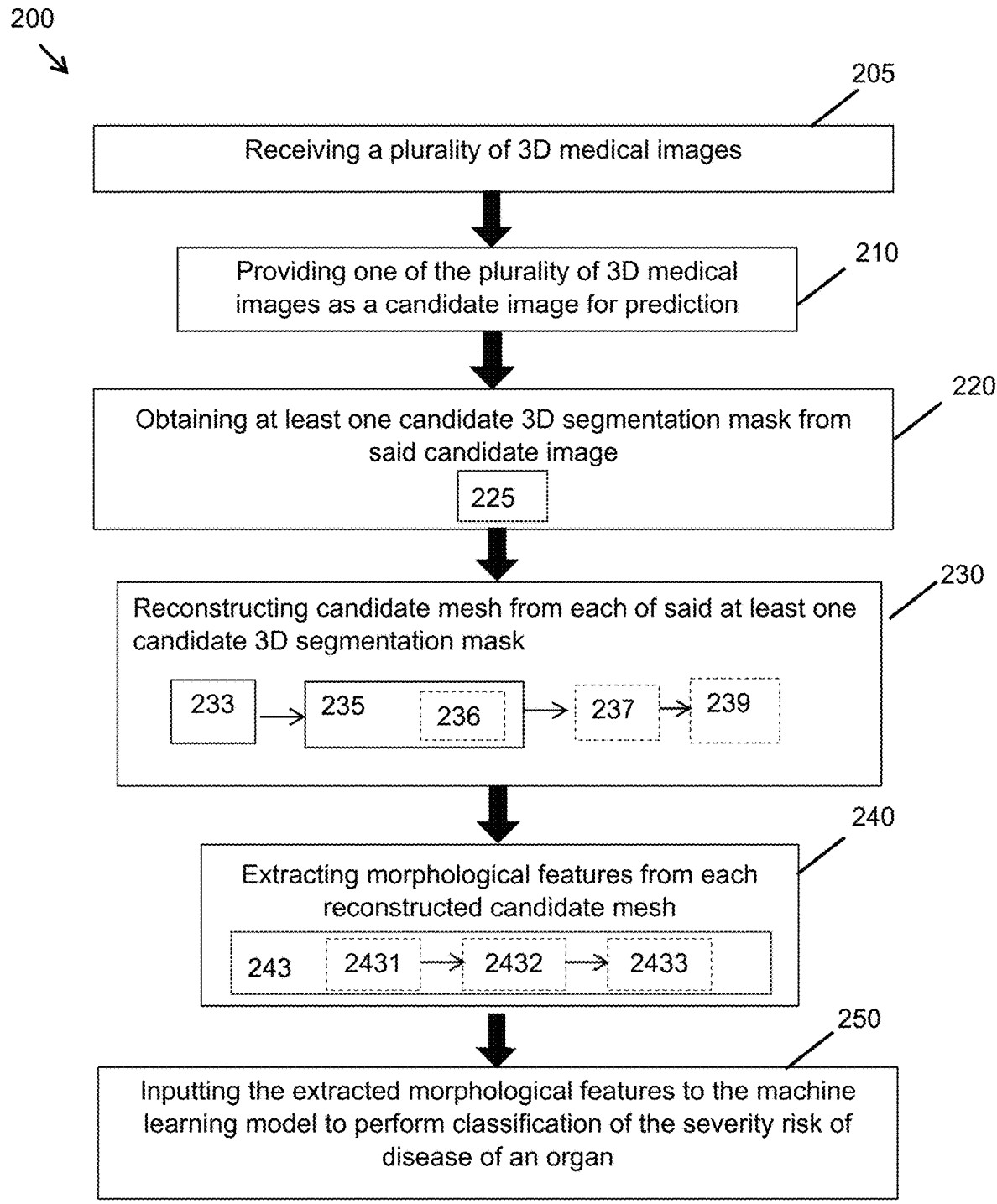
FIG. 6 is a flowchart according to some examples of the method according to the second aspect of the present disclosure.

FIG. 5 shows the performance of the malignancy prediction using curvature features only. In FIG. 6, an AUCROC score of 0.93 is achieved. In the example of lung malignancy prediction (benign: 0, malignant: 1 or vice versa), only the curvature distribution and the mesh's energy of the lung nodule are used as features for malignancy characterization with the number of smoothing iteration set to 0, the classification by a Random Forest into benign or malignant nodule gives an AUCROC of 0.93.

FIG. 6 shows a flowchart according to some examples of the method 200 of the second aspect of the present disclosure, that is, a method for predicting the severity risk of disease from a plurality of 3-dimensional medical images by applying a machine learning model. The machine learning model may have been generated by implementing the method 100 according to any embodiment of the first aspect of the disclosure.

It is to be noted that in the context of the present disclosure, the description made previously to the embodiments of the method 100 should be applicable to the embodiments of the method 200. For example, terms such as "organ", "disease", "a plurality of", "3-dimensional medical images", "anatomical structure", "segmentation mask", "reconstructing", "morphological features", "curvature", "mean curvature", "Gaussian curvature", "baseline features", "patient's clinical information" and so on have the same meaning in the method 200 as in the method 100.

As shown in FIG. 6, the method 200 comprises a step 205 of receiving a plurality of 3-dimensional medical images, each image of the plurality of 3-dimensional medical images comprising at least one anatomical structure a patient. The method 200 further comprises a step 210 of providing one of the plurality of medical images as a candidate image for prediction.

As shown in FIG. 6, the method 200 further comprises a step 220 of obtaining at least one candidate 3-dimensional segmentation mask from said candidate image. In some examples, each mask of the at least one candidate 3-dimensional segmentation mask may comprise at least one anatomical structure. The step 220 of obtaining at least one candidate 3-dimensional segmentation mask from each candidate image may comprise a step 225 of segmenting each candidate image so that at least one candidate 3-dimensional segmentation mask is generated for said candidate image and each mask comprises at least one anatomical structure. It is to be understood that if an automatic segmentation method is deployed in the present method, this may advantageously lead to an automatic classification of the severity risk of the disease.

As shown in FIG. 6, the method 200 may further comprise a step 230 of reconstructing candidate mesh from each of said at least one candidate 3-dimensional segmentation mask. The step 230 may be conformed to the step 130 as detailed above. That is, the step 230 of reconstructing candidate mesh from each of at least one candidate 3-dimensional segmentation mask may comprise a step 233 of extracting a candidate mesh from each candidate 3-dimensional segmentation mask, then a step 235 of simplifying each reconstructed candidate mesh, followed by a step 237 of smoothing the simplified reconstructed candidate mesh. The step 230 of reconstructing candidate mesh from each candidate 3-dimensional segmentation mask may further comprise, after reconstructing 230 and before extracting 240, a step 239 of light smoothing, in order to close the holes on the simplified mesh. Each of the steps 233, 235, 237 and 239 may be conformed respectively to each of the steps 133, 135, 137 and 139 as detailed above.

Still referring to FIG. 6, the method 200 further comprise a step 240 of extracting morphological features from each candidate reconstructed mesh. The step 240 may be conformed to the step 140 as detailed above.

In some examples, the step 240 of extracting morphological features may comprise a step 243 of computing the distribution of curvatures of the reconstructed candidate mesh and the associated candidate mesh's energy E(M)=IM IKcldM.

In some further examples, the step 243 of computing curvatures of the reconstructed candidate mesh may comprise the following sub-steps:
- a sub-step 2431 of computing the mean curvature or gaussian curvature on the mesh,
- a sub-step 2432 of calculating the probability distribution of the mean curvature or gaussian curvature over the mesh, and
- a sub-step 2433 of binning said probability distribution to distribution histograms.

It is to be appreciated that each of the sub-steps 2431, 2432 and 2433 may be conformed respectively to each of the sub-steps 1431, 1432 and 1433 as detailed above.

Still referring to FIG. 6, the method 200 may further comprise a step 250 of inputting the extracted morphological features to the machine learning model to perform classification of the severity risk of disease. It is thus achieved the prediction of the severity risk of disease from a plurality of 3-dimensional medical images. The embodiments and aspects of the here detailed disclosure may be described and illustrated in conjunction with systems, devices and methods which are meant to be exemplary and illustrative, not limiting in scope. Specific configurations and details may be set forth in order to provide an understanding of the disclosure. However, it should be apparent to one skilled in the art that the disclosure may be practiced without some of the specific details being presented herein. Furthermore, some well-known steps or components may be described only generally, or even omitted, for the sake of illustrative clarity.

Some processes may be presented and described in a series (sequence) of steps. It should be understood that the sequence of steps is exemplary, and that the steps may be performed in a different order than presented, some steps which are described may be omitted, and some additional steps may be omitted from the sequence and may be described elsewhere.

Reference may be made to disclosures of prior patents, publications and applications. Some text and drawings from those sources may be presented herein, but may be modified, edited or commented to blend more smoothly with the disclosure of the present application. Citation or identification of any reference should not be construed as an admission that such reference is available as prior art to the disclosure.

The methods described herein may be implemented on any form of computer or computers. The components thereof may be implemented as dedicated applications or in client-server architectures, including a web-based architecture, and can include functional programs, codes, and code segments. Any of the computers may comprise a processor, a memory for storing program data and executing it, a permanent storage such as a disk drive, a communication port for handling communications with external devices, and user interface devices, including a display, keyboard, mouse, etc. When some software or algorithms are involved, they may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

For the purposes of promoting an understanding of the principles of various embodiments of the disclosure, reference has been made to a preferred embodiment illustrated in the drawings, and specific language has been used to describe this embodiment. However, no limitation of the scope of the disclosure is intended by this specific language, and the disclosure should be construed to encompass all embodiments that would normally occur to one of ordinary skill in the art.

The disclosure may be described in terms of functional block components and various processing steps. Such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, where the elements of the present disclosure are implemented using software programming or software elements the present disclosure may be implemented with any programming or scripting language such as C, C++, Java, Python, assembler, or the like, with the various algorithms being implemented with any combination of data structures, objects, processes, routines or other programming elements. Functional aspects may be implemented in algorithms that execute on one or more processors. Furthermore, the present disclosure could employ any number of conventional techniques for electronics configuration, signal processing and/or control, data processing and the like.

This disclosure generally relates to methods and systems for diagnosis of pathologies based on morphological characteristics computed on medical images. The disclosure more particularly relates to a machine learning model for prediction of the severity of disease based on the morphological characteristics.

Since the beginning of medicine, morphology or morphological characteristics have been providing symptomatic phenotypes which enrich the information available to the physician to establish the clinical diagnosis. Morphology deals with the study of the form and structure of organisms and their specific structural features, in particular, the two-dimensional or three-dimensional anatomical structure (for example organ or sub-tissue). According to the generic principle of a correspondence between the structure and the function in biology, a dysfunction of a biological process always goes together with a pathological deformation of the underlying biological structure.

In order to take advantage of the morphology to facilitate the clinical diagnosis, it is proposed in U.S. Pat. No. 10,130,295 B2 entitled "Methods for the detection and staging of liver fibrosis from image acquired data" to use a quantitative method for measuring liver surface nodularity and calculate a liver surface nodularity score. A morphological feature is a function, process or observation that computes a scalar from the approximated geometry or topology of a 2D image or 3D volume. Unfortunately, morphological features are often difficult to quantify.

Several publications are directed to the characterization of deformations of an organ or a sub-tissue by objectively quantifying the morphological characteristics, such as Choi W., et al., Reproducible and interpretable spiculation quantification for lung cancer screening, Computer Methods and Programs in Biomedicine. vol. 200 (2021); and CN patent no. 113066583A entitled "Aneurysm rupture risk prediction method and device and storage medium."

However, such quantifications are limited to rough and coarse geometric quantifiers such as functions of distances area or volumes, which usually fail to take into account of the full information of the morphology. Furthermore, a system using such quantifiers to perform a diagnosis prediction will fail to achieve high prediction accuracy. Meanwhile, organ or sub-tissue local deformations are usually good geometrical and topological indicators of pathology since diseases often result in anisotropic or local inflation.

Thus, a desirable approach would be to make appropriate use of the morphological characteristics for accurate disease prediction, in particular optimizing performance on the prediction of disease severity as evaluated for example by the AUC-ROC score.

According to an aspect of the invention, disclosed is a method for generating a machine learning model for prediction of the severity risk of a disease from a plurality of 3-dimensional medical images, comprising the steps of:
  Providing a plurality of 3-dimensional medical images, each image of the plurality of 3-dimensional medical images comprising at least one anatomical structure of a patient;
  Obtaining at least one 3-dimensional segmentation mask from each image of the plurality of 3-dimensional medical images, each mask of said at least one 3-dimensional segmentation mask comprising at least one anatomical structure;
  Reconstructing a mesh from each 3-dimensional segmentation mask;
  Extracting morphological features from each reconstructed mesh; and
  Training a machine learning model to perform classification of the severity risk of disease, wherein the training is performed on the extracted morphological features.

In some examples, reconstructing mesh from each 3-dimensional segmentation mask comprises extracting a mesh from a 3-dimensional segmentation mask by using Marching cube, and preferably by using Lewiner Marching Cube. Moreover, reconstructing a mesh from each 3-dimensional segmentation mask further comprises a step of simplifying each reconstructed mesh in order to remove inconsistencies. In addition, reconstructing mesh from each mask of said at least one 3-dimensional segmentation mask may further comprise, after simplifying each reconstructed mesh, a smoothing step in order to detect and remove artifacts. Said smoothing step may be determined based on the anatomical structure comprised in the segmentation mask, preferably among:

anisotropic smoothing and/or Laplacian smoothing, or anisotropic smoothing and/or Taubin smoothing.

In some examples, morphological features may comprise at least a distribution of curvatures of the reconstructed mesh, preferably a distribution of discrete curvatures of the reconstructed mesh. Moreover, extracting morphological features may comprise computing the distribution of curvatures of the reconstructed mesh and an associated mesh's energy. More particularly, computing the distribution of curvatures of the reconstructed mesh may comprise the steps of:

computing the mean curvature or gaussian curvature on the mesh by using preferably an approximation of the Steiner formula,
    calculating the probability distribution of the mean curvature or gaussian curvature over the mesh, and
    binning said probability distribution to distribution histograms.

In addition to said distribution of curvatures, the morphological features may further comprise baseline features. Said baseline features may comprise at least one among:

a volume of said at least one anatomical structure,
    an elongation of said at least one anatomical structure,
    a min and/or max size of oriented bounding boxes of said at least one anatomical structure, and
    an HPI mean of said at least one anatomical structure.

In some examples, the machine learning model being trained is a supervised classifier model, preferably a decision-tree based classifier.

In some examples, the method according to the first aspect of the invention may further comprise:

providing clinical information about each patient, and wherein the training is further performed on patient's clinical information.

In some examples, the method according to the first aspect of the invention may further comprise:

extracting, from the plurality of 3-dimensional medical images, other radiomics features than morphological ones, and wherein the training is further performed on said other radiomics features.

Said other radiomics features may comprise at least one among: the state of the art library of radiomics provided by Van Griethuysen et al., comprising Haralick GLCM (Gray Level Co-occurrence Matrix), GLRLM (Gray Level Run Length Matrix), GLSZM (Gray Level Size Zone Matrix), NGTDM (Neighbouring Gray Tone Difference Matrix), GLDM (Gray Level Dependence Matrix) features, standard statistics of image grey level intensity features and classical morphology related features.

In some examples, the training is performed on said morphological features and on at least one type of features among patient's clinical information and said other radiomics features.

According to a second aspect, disclosed is a method for predicting the severity risk of a disease from a plurality of 3-dimensional medical images by applying a machine learning model, comprising the steps of:

Receiving a plurality of 3-dimensional medical images, each image of the plurality of 3-dimensional medical images comprising at least one anatomical structure of a patient;
    Providing one of the plurality of medical images as a candidate image for prediction,
    Obtaining at least one candidate 3-dimensional segmentation mask from said candidate image, each mask of said at least one candidate 3-dimensional segmentation mask comprising at least one anatomical structure;
    Reconstructing candidate mesh from each mask of said at least one candidate 3-dimensional segmentation mask;
    Extracting morphological features from each reconstructed candidate mesh;
    Inputting the extracted morphological features to the machine learning model to perform classification of the severity risk of disease.

In some examples, said machine learning model has been generated by implementing a method for generating a machine learning model according to the first aspect of the invention.

In some examples, reconstructing candidate mesh from each mask of said at least one candidate 3-dimensional segmentation mask comprises extracting a mesh from a 3-dimensional segmentation mask by using Marching cube, and preferably by using Lewiner Marching Cube. Moreover, reconstructing candidate mesh from each mask of said at least one candidate 3-dimensional segmentation mask may further comprise a step of simplifying each reconstructed candidate mesh in order to remove inconsistencies. In addition, reconstructing candidate mesh from each mask of said at least one candidate 3-dimensional segmentation mask may further comprise, after simplifying each reconstructed candidate mesh, a smoothing step in order to detect and remove artifacts. Said smoothing step may be determined based on the candidate anatomical structure comprised in the candidate segmentation mask, preferably among:

anisotropic smoothing and/or Laplacian smoothing, or anisotropic smoothing and/or Taubin smoothing.

In some examples, morphological features may comprise at least a distribution of curvatures of the reconstructed candidate mesh, preferably a distribution of discrete curvatures of the reconstructed candidate mesh. Moreover, extracting morphological features comprises computing the distribution of curvatures of the reconstructed candidate mesh and the associated candidate mesh's energy. More particularly, computing the distribution of curvatures of the reconstructed candidate mesh may comprise the steps of:

computing the mean curvature or Gaussian curvature on the mesh by using preferably an approximation of the Steiner formula,
    calculating the probability distribution of the mean curvature or Gaussian curvature over the mesh, and
    binning said probability distribution to distribution histograms.

In addition to said distribution of curvatures, the morphological features may further comprise baseline features. Said baseline features may comprise at least one among:

a volume of said at least one anatomical structure,
    the elongation of said at least one anatomical structure,
    a min and/or max size of oriented bounding boxes of said at least one anatomical structure, and
    an HPI mean of said at least one anatomical structure.

According to either the first aspect of the invention or the second one, the 3-dimensional medical images may comprise Computed Tomography (CT) images and/or Magnetic Resonance Imaging (MRI) images. A further aspect of the present disclosure relates to a non-transitory computer readable medium storing instructions which, when implemented by at least one digital processing device, performs at least the steps of the method according the first aspect of the invention and/or the steps of the method according the second aspect of the invention.

A further aspect of the present disclosure relates to a computer program product comprising instructions which, when implemented by at least one digital processing device, performs at least the steps of the method according the first aspect of the invention and/or the steps of the method according the second aspect of the invention.

Other objects, features and advantages of the invention(s) disclosed herein, and their various embodiments/aspects, may become apparent in light of the descriptions of some exemplary embodiments that follows.

The invention claimed is:

1. A method for training at least one computing operation using 3-dimensional images and using at least one trained computing operation on an input 3-dimensional image, the method comprising:
receiving, from a first geographical location, at a first time, using one or more hardware computing device processors, a first image comprising a first 3-dimensional image displaying at least one detectable structure, wherein the at least one detectable structure comprises at least one quantifiable visual feature;
determining, using the one or more hardware computing device processors, based on the first image, the at least one detectable structure;
segmenting, using the one or more hardware computing device processors, the first image to obtain a first segmentation mask, wherein the first segmentation mask is associated with at least one geometric shape and comprises the at least one quantifiable visual feature;
generating, using the one or more hardware computing device processors, based on the first segmentation mask, a first mesh based on or comprising the at least one quantifiable visual feature,
wherein the first mesh is associated with a first surface,
wherein the first surface is associated with a first set of vertices;
geometrizing the first mesh, based on a first geometric parameter, thereby resulting in a first geometrized mesh;
computing or determining, using the one or more hardware computing device processors, at least one first quantifiable visual parameter based on the first mesh;
extracting, using the one or more hardware computing device processors, a first quantifiable visual data from the first image based on the at least one first quantifiable visual parameter;
training the at least one computing operation using the first quantifiable visual data as a first input;
receiving, from the first geographical location or a second geographical location, at the first time or a second time, using the one or more hardware computing device processors, a second image comprising a second 3-dimensional image displaying the at least one detectable structure, wherein the at least one detectable structure comprises the at least one quantifiable visual feature;
determining, using the one or more hardware computing device processors, based on the second image, the at least one detectable structure;
segmenting, using the one or more hardware computing device processors, the second image to obtain a second segmentation mask, wherein the second segmentation mask is associated with the at least one geometric shape and comprises the at least one quantifiable visual feature;
generating, using the one or more hardware computing device processors, based on the second segmentation mask, a second mesh based on or comprising the at least one quantifiable visual feature,
wherein the second mesh is associated with a second surface,
wherein the second surface is associated with a second set of vertices;
geometrizing the second mesh, based on the first geometric parameter or a second geometric parameter, thereby resulting in a second geometrized mesh;
computing or determining, using the one or more hardware computing device processors, at least one second quantifiable visual parameter for the second mesh;
extracting, using the one or more hardware computing device processors, a second quantifiable visual data from the second image based on the at least one second quantifiable visual parameter;
training the at least one computing operation using the second quantifiable visual data as a second input;
receiving, from the first geographical location, the second geographical location, or a third geographical location, at the first time, the second time, or a third time, using the one or more hardware computing device processors, a third image comprising a third 3-dimensional image displaying the at least one detectable structure, wherein the at least one detectable structure comprises the at least one quantifiable visual feature;
determining, using the one or more hardware computing device processors, based on the third image, the at least one detectable structure;
segmenting, using the one or more hardware computing device processors, the third image to obtain a third segmentation mask, wherein the third segmentation mask is associated with the at least one geometric shape and comprises the at least one quantifiable visual feature;
generating, using the one or more hardware computing device processors, based on the third segmentation mask, a third mesh based on or comprising the at least one quantifiable visual feature,
wherein the third mesh is associated with a third surface,
wherein the third surface is associated with a third set of vertices;
geometrizing the third mesh, based on the first geometric parameter, the second geometric parameter, or a third geometric parameter, thereby resulting in a third geometrized mesh;
computing or determining, using the one or more hardware computing device processors, at least one third quantifiable visual parameter for the third mesh;
extracting, using the one or more hardware computing device processors, a third quantifiable visual data from the third image based on the at least one third quantifiable visual parameter;
training the at least one computing operation using the third quantifiable visual data as a third input;
receiving, from a fourth geographical location that is different from all of the first geographical location, the second geographical location, and the third geographical location, at a fourth time that is different from all of the first time, the second time, and the third time, using the one or more hardware computing device processors, a fourth image comprising a fourth 3-dimensional image displaying the at least one detectable structure;

determining, using the one or more hardware computing device processors, based on the fourth image, the at least one detectable structure;

segmenting, using the one or more hardware computing device processors, the fourth image to obtain a fourth segmentation mask, wherein the fourth segmentation mask is associated with the at least one geometric shape and comprises the at least one quantifiable visual feature;

generating, using the one or more hardware computing device processors, based on the fourth segmentation mask, a fourth mesh comprising the at least one quantifiable visual feature,
wherein the fourth mesh is associated with a fourth surface,
wherein the fourth surface is associated with a fourth set of vertices;

geometrizing the fourth mesh, based on the first geometric parameter, the second geometric parameter, the third geometric parameter, or a fourth geometric parameter, thereby resulting in a fourth geometrized mesh;

computing or determining, using the one or more hardware computing device processors, at least one fourth quantifiable visual parameter for the fourth mesh;

extracting, using the one or more hardware computing device processors, a fourth quantifiable visual data from the fourth image based on the at least one fourth quantifiable visual parameter;

classifying, based on the training the at least one computing operation using the first quantifiable visual data as the first input, the training the at least one computing operation using the second quantifiable visual data as the second input, and the training the at least one computing operation using the third quantifiable visual data as the third input, using the one or more computing device processors, the fourth quantifiable visual data, thereby resulting in a classification;

generating, using the one or more hardware computing device processors, based on the classification, a computation result for the fourth image; and correlating, using the one or more hardware computing device processors, the computation result with a malignancy dataset associated with the at least one detectable structure, thereby resulting in correlation data.

2. The method of claim 1, wherein the at least one quantifiable visual feature comprises at least one of a morphological characteristic or a radiomic feature.

3. The method of claim 1, wherein at least one of the at least one first quantifiable visual parameter, the at least one second quantifiable visual parameter, the at least one third quantifiable visual parameter, or the at least one fourth quantifiable visual parameter comprises a geometric parameter.

4. The method of claim 1, wherein the first geometrized mesh, the second geometrized mesh, the third geometrized mesh, or the fourth geometrized mesh is associated with a first curvature distribution, a second curvature distribution, a third curvature distribution, or a fourth curvature distribution, respectively; and
the method further comprises determining a geometric variance associated with the fourth geometrized mesh based on at least one difference between the fourth curvature distribution and at least one of the first curvature distribution, the second curvature distribution, and the third curvature distribution.

5. The method of claim 1, wherein the classification is based on a geometric variance calculated based on the fourth quantifiable visual data.

6. The method of claim 1, wherein the at least one detectable structure comprises an anatomical structure.

7. The method of claim 1, wherein the at least one detectable structure comprises at least one of a pulmonary structure or a hepatic structure.

8. The method of claim 1, further comprising at least one of:
segmenting the first image further comprises automated segmenting of the first image,
segmenting the second image further comprises automated segmenting of the second image,
segmenting the third image further comprises automated segmenting of the third image, or
segmenting the fourth image further comprises automated segmenting of the fourth image.

9. The method of claim 1, wherein at least one of:
the first segmentation mask further comprises a first 3-dimensional segmentation mask,
the second segmentation mask further comprises a second 3-dimensional segmentation mask,
the third segmentation mask further comprises a third 3-dimensional segmentation mask, or
the fourth segmentation mask further comprises a fourth 3-dimensional segmentation mask.

10. The method of claim 1, wherein the at least one quantifiable visual feature comprises at least one of: a volume of the at least one detectable structure, an elongation of the at least one detectable structure, a dimension or size of a bounding box of the at least one detectable structure, a dimension of size of an oriented bounding box of the at least one detectable structure, an index value of the at least one detectable structure, a hepatic perfusion index value of the at least one detectable structure, or an average hepatic perfusion index value of the at least one detectable structure.

11. The method of claim 1, wherein at least one of the first 3-dimensional image, the second 3-dimensional image, the third 3-dimensional image, or the fourth 3-dimensional image comprises a 3-dimensional medical image.

12. The method of claim 1, further comprising:
determining, using the one or more hardware computing device processors, based on the correlation data, a likelihood of disease affecting at least a portion of the at least one detectable structure.

13. The method of claim 1, wherein the one or more hardware computing device processors are comprised in one or more computing systems, wherein the one or more computing systems are located in one or more locations.

14. An apparatus for training at least one computing operation using 3-dimensional images and using at least one trained computing operation on an input 3-dimensional image, the apparatus comprising at least one hardware computing device processor configured to:
receive, from a first geographical location, at a first time, a first image comprising a first 3-dimensional image displaying at least one detectable structure, wherein the at least one detectable structure comprises at least one quantifiable visual feature;
determine, based on the first image, the at least one detectable structure;
segment the first image to obtain a first segmentation mask, wherein the first segmentation mask is associated with at least one geometric shape and comprises the at least one quantifiable visual feature;

generate, based on the first segmentation mask, a first mesh based on or comprising the at least one quantifiable visual feature,
   wherein the first mesh is associated with a first surface,
   wherein the first surface is associated with a first set of vertices;
geometrize the first mesh, based on a first geometric parameter, thereby resulting in a first geometrized mesh;
compute or determine at least one first quantifiable visual parameter based on the first mesh;
extract a first quantifiable visual data from the first image based on the at least one first quantifiable visual parameter;
train the at least one computing operation using the first quantifiable visual data as a first input;
receive, from the first geographical location or a second geographical location, at the first time or a second time, a second image comprising a second 3-dimensional image displaying the at least one detectable structure, wherein the at least one detectable structure comprises the at least one quantifiable visual feature;
determine, based on the second image, the at least one detectable structure;
segment the second image to obtain a second segmentation mask, wherein the second segmentation mask is associated with the at least one geometric shape and comprises the at least one quantifiable visual feature;
generate, based on the second segmentation mask, a second mesh based on or comprising the at least one quantifiable visual feature,
   wherein the second mesh is associated with a second surface,
   wherein the second surface is associated with a second set of vertices;
geometrize the second mesh, based on the first geometric parameter or a second geometric parameter, thereby resulting in a second geometrized mesh;
compute or determine at least one second quantifiable visual parameter for the second mesh;
extract a second quantifiable visual data from the second image based on the at least one second quantifiable visual parameter;
train the at least one computing operation using the second quantifiable visual data as a second input;
receive, from the first geographical location, the second geographical location, or a third geographical location, at the first time, the second time, or a third time, a third image comprising a third 3-dimensional image displaying the at least one detectable structure, wherein the at least one detectable structure comprises the at least one quantifiable visual feature;
determine, based on the third image, the at least one detectable structure;
segment the third image to obtain a third segmentation mask, wherein the third segmentation mask is associated with the at least one geometric shape and comprises the at least one quantifiable visual feature;
generate, based on the third segmentation mask, a third mesh based on or comprising the at least one quantifiable visual feature,
   wherein the third mesh is associated with a third surface,
   wherein the third surface is associated with a third set of vertices;
geometrize the third mesh, based on the first geometric parameter, the second geometric parameter, or a third geometric parameter, thereby resulting in a third geometrized mesh;
compute or determine at least one third quantifiable visual parameter for the third mesh;
extract a third quantifiable visual data from the third image based on the at least one third quantifiable visual parameter;
train the at least one computing operation using the third quantifiable visual data as a third input;
receive, from a fourth geographical location that is different from all of the first geographical location, the second geographical location, and the third geographical location, at a fourth time that is different from all of the first time, the second time, and the third time, a fourth image comprising a fourth 3-dimensional image displaying the at least one detectable structure;
determine, based on the fourth image, the at least one detectable structure;
segment the fourth image to obtain a fourth segmentation mask, wherein the fourth segmentation mask is associated with the at least one geometric shape and comprises the at least one quantifiable visual feature;
generate, based on the fourth segmentation mask, a fourth mesh comprising the at least one quantifiable visual feature,
   wherein the fourth mesh is associated with a fourth surface,
   wherein the fourth surface is associated with a fourth set of vertices;
geometrize the fourth mesh, based on the first geometric parameter, the second geometric parameter, the third geometric parameter, or a fourth geometric parameter, the fourth mesh, thereby resulting in a fourth geometrized mesh;
compute or determine at least one fourth quantifiable visual parameter for the fourth mesh;
extract a fourth quantifiable visual data from the fourth image based on the at least one fourth quantifiable visual parameter;
classify, based on the training the at least one computing operation using the first quantifiable visual data as the first input, the training the at least one computing operation using the second quantifiable visual data as the second input, and the training the at least one computing operation using the third quantifiable visual data as the third input, the fourth quantifiable visual data, thereby resulting in a classification;
generate, based on the classification, a computation result for the fourth image; and
correlate the computation result with a malignancy dataset associated with the at least one detectable structure, thereby resulting in correlation data.

15. The apparatus of claim 14, wherein the apparatus comprises or is comprised in one or more computing systems associated with one or more locations.

16. The apparatus of claim 14, wherein the at least one quantifiable visual feature comprises at least one of a morphological characteristic or a radiomic feature.

17. The apparatus of claim 14, wherein at least one of the at least one first quantifiable visual parameter, the at least one second quantifiable visual parameter, the at least one third quantifiable visual parameter, or the at least one fourth quantifiable visual parameter comprises a geometric parameter.

18. The apparatus of claim 14, wherein the first geometrized mesh, the second geometrized mesh, the third geometrized mesh, or the fourth geometrized mesh is associated with a first curvature distribution, a second curvature distribution, a third curvature distribution, or a fourth curvature distribution, respectively; and the at least one hardware computing device processor is configured to determine a geometric variance associated with the fourth geometrized mesh based on at least one difference between the fourth curvature distribution and at least one of the first curvature distribution, the second curvature distribution, and the third curvature distribution.

19. The apparatus of claim 14, wherein the classification is based on a geometric variance calculated based on the fourth quantifiable visual data.

20. The apparatus of claim 14, wherein the at least one detectable structure comprises an anatomical structure.

* * * * *